United States Patent
Sulman et al.

[11] Patent Number: 5,915,887
[45] Date of Patent: Jun. 29, 1999

[54] REFINEMENTS IN AIR-QUALITY PROTECTION AND SEAL CONTROL, IN A PARTICULATE-MATERIAL GUN USABLE WITH SILICA FUME

[75] Inventors: Paul E. Sulman, Aliso Viejo; David J. Stoner, Corona Del Mar, both of Calif.

[73] Assignee: Reed Manufacturing, Inc., Chino, Calif.

[21] Appl. No.: 08/802,628

[22] Filed: Feb. 19, 1997

Related U.S. Application Data

[63] Continuation-in-part of application No. 08/561,788, Nov. 22, 1995, Pat. No. 5,645,379.
[51] Int. Cl.[6] .................................................. B65G 53/46
[52] U.S. Cl. .......................... 406/63; 406/64; 406/68; 222/367
[58] Field of Search ........................... 406/39, 63, 64, 406/68; 222/367, 636

[56] References Cited

U.S. PATENT DOCUMENTS

| | | | |
|---|---|---|---|
| 3,161,442 | 12/1964 | Reed | 406/63 |
| 5,094,403 | 3/1992 | Tschumi | 406/64 X |
| 5,150,991 | 9/1992 | Stoner et al. | 406/67 |

*Primary Examiner*—Andrew C. Pike
*Attorney, Agent, or Firm*—Ashen & Lippman

[57] ABSTRACT

Dust emission is controlled by a preferably short fill at the expulsion end of each chamber, and selective venting of residual pressure through the air-inlet end. This selective venting is accomplished through use of a novel seal or "pad" that has an extension for tightly covering and sealing the material-exhaust end of each chamber while the chamber is in a dust-control plenum. The pad extension is notched so that it leaves the air-inlet end uncovered, permitting pressure venting through the notch and the air-inlet end. To provide truly effective sealing of the pad extension against the wear plate above the chamber that is in the plenum, the extension is reinforced by a strong metal plate which is embedded in the pad. Careful contouring of the main material-conveying ports in the pad optimizes the performance. A new all-pneumatic pad-clamping pressure-control system has been found to provide excellent control of pressure and uniformity of wear, with a minimum of working parts and adjustments.

10 Claims, 10 Drawing Sheets

REFINEMENTS IN AIR-QUALITY PROTECTION AND SEAL CONTROL, IN A PARTICULATE-MATERIAL GUN USABLE WITH SILICA FUME

RELATED APPLICATION

This is a continuation-in-part of U.S. utility-patent application Ser. No. 08/561,788, filed on Nov. 22, 1995, and issued Jul. 8, 1997 as U.S. Pat. No. 5,645,379. That document, including its drawings, is wholly incorporated by reference into this present document.

FIELD OF THE INVENTION

This invention relates generally to apparatus for conveying particulate material (such as gunite, refractories, etc.) to and through a delivery tube—and more particularly relates to such an apparatus usable with modernly favored constituents (e. g., silica fume) that are especially susceptible to dust emission. Such apparatus also requires delicate but effective control of clamping pressure for elastomeric seals that help contain the particulate material in the conveying apparatus.

BACKGROUND

Seminal work in this field is memorialized in 1964 U.S. Pat. No. 3,161,442 of Frank A. Reed. He devised a rotary feed structure in the form of a segmented rotating bowl, to carry particulate material from a hopper to a delivery tube—with compressed-air expulsion of the material from U-shaped passageways or "pockets" of the feed bowl into the delivery tube.

Strengths of Reed's system are that only one relatively small area about the expulsion station must be sealed to constrain the compressed air and the material, and gravity tends to retain the material in the bowl (thus minimizing deterioration of the seal) until the material reaches the expulsion station. The sealing is accomplished by a thick elastomeric body—called a "pad"—of segmental shape. Apertures are formed in the pad for attachment of a pressurized-air fitting and the delivery tube, so that as each particular pocket in succession rotates into the expulsion station the particulate is blown out of that pocket through the pad and into the delivery tube.

The pad is cast-bonded to a metal top plate, which receives sealing force from cams above the plate edges and helps distribute this force over the pad area. Some sealing action around the edge of the pad is provided by a peripheral (except at the outer face of the machine) ridge or lip that engages adjacent radial, vertical walls of the mechanism. The sealing lip essentially helps to maintain separation of the inside of the machine from the outside—in the segmental area occupied by the pad—to minimize escape of dust and particulate at the edges of that segmental area.

During use the bottom of the pad is ground off by the abrasive particulates in the gunite, and the pad correspondingly descends. To accommodate this motion the cams extend and the lip slides downward along the radial vertical walls.

Analogous European developments aimed for different benefits, settling on a straight-through rotary structure that tends to be clog resistant (though not entirely immune) because it is gravity-assist-emptied as well as gravity-filled, and because the particulate material need not negotiate hairpin curves within the feed chambers.

The European configurations, however, are inherently bulkier vertically and employ two very large seals, at top and bottom respectively. The highly abrasive material to be dispensed is gravity-loaded against the lower seal, which is therefore subject to extreme wear.

Reed's patent too is hereby fully incorporated by reference into this document, as is 1991 U.S. Pat. No. 5,150,991—coowned with the present document by Reed Manufacturing, Inc.—which introduced very important refinements directed to control of the compressed-air-and-material sealing system.

Smooth flow—Issues of susceptibility to clogging were generally put to rest for many years by careful early design of passageways in the Reed cast-iron bowl, and also by controlling the direction of loading of relatively large rock or gravel pieces. In this regard, in a Reed machine a so-called "rock cone" is sometimes disposed at the axis of rotation.

The rock cone blocks the relatively large particulate from loading into the air-input end of each chamber: in the Reed system, the input ends are arrayed closely about the axis, and the output ends are arrayed nearer the periphery of the rotary bowl. Due to the radiating geometry of the system, the input ends are much more tightly constricted; and the cone is thought to help deter mechanical jamming of heavier aggregate in these input ends.

The rock cone is longitudinally slotted, to permit finer particulate material from the hopper to pass through and load directly into the air-input end of each chamber. This finer material poses no threat of mechanically jamming the input.

Recently, however, these flow issues have reappeared because of modern developments in gunite materials. This is true, in particular, of certain materials which have entered into favor for underground work, e. g., in mines and subway tunnels, where waterproofing is critical and development of small defects can create monumental damage.

For such applications, a material that tends to fill tiny gaps and enhance waterproofing is highly prized. Just such a material, for instance, is so-called "silica fume"—finely divided and somewhat resembling talcum. Previously regarded as a waste product, silica fume is currently popular, for its characteristics just outlined, as a constituent of particulate material for underground gunite use.

Unfortunately this same material also tends to create or aggravate limitations of the original design concepts of rotary feed structures. Silica fume and like materials when slightly moist tend to adhere strongly to cast-iron surfaces, partially set, and thus build up in a delivery system and choke off the passageways in the feed structure. (We here refer to build-up on internal surfaces of the passageways, not on the seal-facing surface discussed earlier in connection with abrasion.) This difficulty has been notable especially, but not exclusively, in the U-pockets of the Reed bowl.

Under field conditions, furthermore, removing the accumulated material is difficult. It can be chipped away, as for instance with a hammer and chisel—but sometimes a worker cannot plainly tell the difference between chipping gunite and chipping cast iron. In any event, as a matter of practical field operations, the efforts required to keep a rotary feed structure clear enough for effective use are often excessive.

Air quality—An analogous historical development can be traced in the area of dust control. Both the Reed and the European machines initially had a tendency to emit dust, because each feed chamber emerging from the expulsion station is still partly pressurized—typically at more than 200 kPa (30 psi).

If such a chamber rotates directly back under the particulate-material hopper to receive another load of material, this residual pressure is at least partially relieved into the hopper. It tends to blow, backward and upward out of the hopper, whatever relatively fine material is present.

This dust emission was a lesser or greater problem depending upon various factors. These included especially the specific type and dryness of material in use, duration of the application session, degree to which the work space and associated areas were confined, and sensitivity of the particular environment (for instance highway, industrial, commercial, or residential) to the esthetics of dust pollution. Where the overall combinations of these factors were relatively less sensitive, dust emission was ignored.

In the relatively more sensitive combinations of these factors, some users developed their own arrangements for mitigation. Such provisions generally took the form of providing some sort of plenum or house, in a region following the expulsion station, to recapture the residual pressurization, and divert it away from the input hopper.

Dust as a pollutant, however, like clogging became a more significant problem with the advent of silica fume as a favored constituent. This material, being finely divided in the extreme, is far more susceptible to becoming airborne.

As before this occurs under the influence of air-pressure residuals after feed-structure chambers have been, in principle, pneumatically emptied. With silica fume, however, merely isolating and venting the residual pressurized air cannot adequately control the situation, because that pressurized air is now directly laden with ultrafine silica-fume silt left in the chamber at the expulsion station.

The finely divided character of this same material also renders it more susceptible to escape through relatively small passageways in the air-pressure sealing system, aggravating its pernicious tendency to float away on relatively small pressure residuals. The overall dust problem posed by silica fume is major when the material is moist, and worse when it is dry.

Therefore a necessity arises to somehow capture and deal with not only the pressurized air but also its entrained silica fume.

Prior mitigation work—Various efforts have been made in this field to overcome or at least reduce the problems arising from use of silica fume and the like. The above-mentioned parent patent document of the present document teaches apparatus and methods for essentially eliminating the flow problems.

As to dust generation, it was natural to attack the special problems of silica fume with familiar tools such as filters and collection chambers. Silica fume, however—by virtue of both its surprisingly high volume and its intimate association with the pressurization itself—turns out to be astonishingly difficult to manage.

Reasonably ample collection bags rapidly overfill, and persistently puff this powder through every seam and crevice. Ordinary filters, if fine enough to be at all useful, quickly clog. The material and the air which carries it are not readily separated from each other.

The resulting fine-airborne-dust problem is particularly insidious in the very environments where silica fume is most highly valued. Miners and other workers in connected cavities—even sometimes when quite remote from a gunite-shooting site—are highly vulnerable to air contamination by such fine particles.

As mentioned earlier, silica fume is particularly troublesome as to dust generation when the material is dry. In some environments this problem can be reduced slightly by using a predampening technique, which essentially consists of spraying the gunite material with quite small amounts of water in a rotating cement mixer before the material enters the hopper.

Such mitigations are not regarded as practical in the context of a mine. Gunite is typically brought into a mine in closed sacks.

Even handling of the sealed sacks of silica fume generates clouds of dust. A sack is attached to the top of the gunite-gun hopper, and then slit open by the machinery. This arrangement is considered necessary to minimize dust generation in transfer of the material from bag to hopper.

Underground operational conditions are cramped and remote, tending to militate against bringing in still an additional piece of equipment (such as a cement mixer). It is for all these reasons that in mining the technique of premoistening is considered infeasible and the dust-control problem has persisted at its worst.

Other efforts at dust control have attempted to take down the air-entrained gunite particles with a water scrubber. We are aware of some gunite-gun products, now on the market for some while, using a so-called "water ring"—a length of pipe formed into a toroid, with water holes drilled through the pipe wall facing toward the center of the toroid.

Such systems do greatly reduce the amount of dust released to the atmosphere. The amount of water used by a commercial prior-art scrubber for a gunite gun, however, is considerable.

The result is to release—usually onto the ground—correspondingly large amounts of very dilute gunite slurry. Most typically the amount of this contaminated water is excessive: it is large enough to be at least troublesome, if not somewhat impractical, to capture and haul away.

With extended operation the result is a notable mess. In unusual cases of very protracted operation, the initial air-pollution problem may even be replaced by a significant water-pollution or waste-disposal problem.

We have also noted that the commercially observed unit mentioned above has a relatively small-diameter exhaust line, terminating in an even smaller constriction. The use of a pneumatic impedance under certain circumstances can be very useful, but in the unit discussed here the small diameter and constriction appear to contribute only back-pressure in the exhaust plenum, and therefore to be counterproductive.

Although the water scrubber has now been accepted by the gunite industry for an extended period of time, it appears to us that this acceptance has been reluctant, and essentially as a last resort. By any other measure, prior-art scrubbers create—because of the amount of water used and discharged—an unprofessional and almost slovenly impression, which would be rejected commercially were it not for the crucial need for dust control.

Thus the need for a well-contained, refined resolution of the dust-emission problem in sensitive environments was long felt, but unmet until the advent of the innovations described in the aforementioned parent patent document. That document describes techniques for controlling both the amount of dust available for entrainment in the exhaust air of a gunite conveying machine, and the pressure with which that dust is expelled from the machine.

In the parent patent document it is shown in detail how the seal which retains the gunite in the feed bowl can be extended to cover the material-exhaust end of each feed chamber in the bowl. In such an arrangement, the material which does not quite manage to escape from the chamber in each delivery cycle is momentarily trapped at the exhaust end of the chamber—and during that moment the pressurization in the chamber can be relieved at the opposite, or air-intake, end of the chamber.

When these strategies are adopted, the trapped dust is thus behind almost all of the pressurized air that escapes from the open air-intake end of the chamber, so that very little dust is in a position to be expelled with and ahead of that escaping pressurized air. Dust emission is thereby dramatically reduced.

In the parent document it is also explained that there are two competing theories which could optimally implement strategies. In one approach the pad—where it extends into an exhaust plenum which follows the expulsion station—is placed in a relatively tight sealing position against the wear ring that is at the top of the feed bowl.

The object is to maximize the beneficial effects described just above. The extended pad, in this approach as described in the parent document, is formed with an additional through-aperture above the air-intake end of the feed chamber that has just passed away from the expulsion station.

In a competing approach, the material-exhaust end of the feed chamber—in that same exhaust plenum region—is guarded not by the tightly pressing pad but by a metal baffle or plate. This panel is actually stood off from the wear ring by some one or two centimeters (i. e., a significant fraction of an inch).

The rationale of this approach is that very tight sealing tends to develop high-pressure particulate leaks that can damage a nearby felt seal or other equipment, and may actually exacerbate leakage. In this approach the baffle is a separately formed metal piece, integral with or fixed to the plenum housing or other metal structure in the plenum region.

In both of these approaches the plenum was configured as a rectangular box, enclosing the pad extension or the stood-off baffle. At the time of preparation of the parent patent document—although the appropriate implementation was becoming clear—no entirely stable design and configuration of the plenum, or of the baffle or the pad extension, had then been achieved.

Thus in the parent document it is said, "we believe that far more effective dust control can be achieved by . . . venting the input end of the chamber through a port in the pressure seal; however, this may require a more extensive reconfiguration of the system, to lengthen the seal in the circumferential direction so that venting can be performed at a point that is safely isolated from the air-pressure source."

The previously mentioned U.S. Pat. No. 5,150,991 teaches substitution of a fluidic control system, in place of the theretofore-employed mechanical screws or levers, for operating the force-applying cams that press the pad against the wear plate of the rotary feed structure. The benefits of that general teaching have been well confirmed in the intervening years.

U.S. Pat. No. 5,150,991 also teaches that the fluidic system advantageously includes a first, pneumatic stage and a second, hydraulic stage—the former particularly contributing easy and delicate control of force levels, and the second particularly contributing positive and rugged application of the resulting forces. In addition the '991 patent teaches use of a check valve in the hydraulic stage, to prevent kickback of high force transients from the gunite-handling mechanical subsystem into the control system.

Although in general this dual system with the check valve has served well, it has in some installations proven slightly temperamental. In addition it is of course somewhat costly.

As can now be seen, the related art remains subject to significant problems, and the efforts outlined above—though praiseworthy—have left room for considerable refinement.

SUMMARY OF THE DISCLOSURE

The present invention introduces such refinement, and through development of reconfiguration specifics—partially as suggested in the above passage from the parent document, but partially otherwise—provides solutions to the problems of the art. The invention has several independently usable main facets or aspects, though we prefer to employ them all in conjunction together to optimize their benefits.

In preferred embodiments of a first of its aspects, the invention is a pad, for use in a particulate-material-conveying machine. The machine itself, as will be understood, is not a part of the invention of this first aspect.

The machine is of a type that has a rotary feed structure with chambers that receive particulate material at an intake sector of the machine. The chambers also convey the particulate material for delivery through a material-outlet end of each chamber when that chamber is positioned at an expulsion station of the machine. The machine also has a dust-exhaust plenum following the expulsion station.

The pad includes a surface for sealing against the rotary feed structure at the expulsion station. The pad also includes a material-delivery port formed through the surface.

In addition the pad includes an extension. The extension is for sealing against the material-outlet end of a chamber at the dust-exhaust plenum.

The foregoing may constitute a description or definition of the first facet or aspect of the invention in its broadest or most general form. Even in this broad form, however, it can be seen that this facet of the invention resolves some of the problems of the prior art.

More specifically, by sealing against the material-outlet end of a chamber in the exhaust plenum, the extension facilitates a selective venting of residual pressurized air from that chamber. This venting is "selective" in the sense that the venting is through the air-inlet or -entry end of the chamber, which is the opposite end from the material-outlet end.

As explained in the parent patent document and summarized earlier in the present document, this forcing of the pressurization to be relieved from the air-inlet end of the chamber minimizes the amount of dust that leaves the chamber with the pressurized air. As a result the dust that is exhausted from the machine is reduced to a very small fraction of the amount exhausted by prior-art systems.

Although the first facet of the invention in its broadest form thus represents an important refinement of the prior art, preferably this aspect of the invention is practiced in conjunction with other features or characteristics that maximize enjoyment of the benefits of the invention. For example, preferably the above-mentioned port is for delivery of the particulate material from a chamber which is at the expulsion station; and the extension is for sealing against a chamber which has passed away from the expulsion station and reached the dust-exhaust plenum.

It is also preferable that the pad further comprise some means for reinforcing the extension. For purposes of generality and breadth in discussing the invention, these means will be called simply the "reinforcing means". The reinforcing means serve to maintain effective sealing pressure of the extension against the material-outlet end of each chamber, at the dust-exhaust plenum.

Preferably too, the surface and the extension are both defined in a generally elastomeric body. In this case it is further preferable that the pad also include a reinforcing plate embedded in the generally elastomeric body. Part of that plate is within the extension.

The reinforcing plate mentioned here is not the same item as the conventional plate that receives pad-clamping force from the clamping mechanisms of the machine. Hence it is still further preferable to include in the pad some means—fixed in or to the elastomeric body—for receiving clamping pressure.

Again for breadth and generality these means will be denominated the "pressure-receiving means". The pressure-receiving means preferably include a second, discrete plate (such as for example, but not limited to, the conventional plate).

It is preferable that the pad also include a notch for passing pressurized air from an air-entry end of each chamber. Also preferably the extension is shallower than other portions of the pad; and an upper surface of the pad is stepped downward at the plenum and is complementary to a shape of the plenum.

The pad preferably is for use in a particulate-material-conveying machine that has an external (usually radial) wall between the expulsion station and the plenum. In this case it is preferable not only that the extension be shallower than other portions of the pad, but also that an upper surface of the pad be stepped downward at the plenum, for providing a sliding seal against that outer wall of the machine.

Preferably the edge of the pad is formed with a partial peripheral ridge or lip to help maintain a fairly good seal against the external wall; as in prior systems the ridge preferably does not entirely encircle the pad—being omitted, in particular, along the outward-facing edge. In preferred embodiments of the present invention the ridge also does not seal around the extension.

In preferred embodiments of a second of its main aspects or facets, the invention is a dust-exhaust plenum. The plenum is for use in a machine generally similar to that which forms the operating environment of the first aspect of the invention—that is, a particulate-material-conveying machine, with a rotary feed structure as described earlier.

The plenum includes a plenum body, and some means for positioning the plenum in the machine, following the expulsion station. For reasons suggested earlier these means are called the "positioning means". The plenum also includes a tube formed within the plenum body.

The tube has a first end for receiving exhaust pressurized air from a gas-inlet end of each chamber when that chamber is at the plenum. The tube also has a second end for exhausting this pressurized air from the machine.

This may constitute a definition or description of the second aspect of the invention in its most general form. Even as thus broadly couched, however, the invention resolves difficulties of the prior art.

In particular the use of such a tube rather than a box-style plenum can minimize the buildup of dust inside the tube. It also helps to keep in suspension, in the exhaust gas stream, the small amount of dust which is present—so that this dust can be carried out of the system incrementally.

Nevertheless to maximize these beneficial effects it is preferable to practice this form of the invention in conjunction with certain other characteristics or features. For instance preferably the interior of the tube is smoothly contoured for enhanced prevention of dust buildup inside the tube. Preferably the interior of the tube has cross-sectional area small enough for maintaining adequate velocity to enhance the keeping of dust in suspension while that dust remains within the plenum.

In a third of its main aspects or facets, the invention is apparatus for conveying particulate material such as (without limitation, of course) gunite. The apparatus includes a hopper and a delivery tube.

It also includes a rotary feed-structure body, defining multiple chambers. These chambers are for successive rotation, about an axis, into positions for receiving the particulate material from the hopper and positions for delivering the particulate material into the delivery tube.

In addition the apparatus includes some means for supporting and rotating the feed structure about the axis. It also includes some means for expelling the particulate material from the chambers into the tube. These material-expelling means include a source of pressurized gas.

Further included are some means for selectively sealing the chambers, when in the delivering positions, to the expelling means and delivery tube—again, "selectively-sealing means". These selectively-sealing means have an extension for selectively sealing one end of each chamber after that chamber passes out of the delivering positions.

The apparatus also includes some means—the "transport means"—for carrying the hopper, the tube, the body, and the supporting, expelling and sealing means.

Even as thus broadly couched, this third aspect of the invention contributes importantly to resolving inadequacies of prior-art apparatus. In particular the selectively-sealing means with the extension facilitate trapping of dust—which is in the residual pressurization—at one end of the chamber.

This strategy can then be exploited to isolate the dust from the residual pressurization itself, when the latter is vented, generally as described above with respect to the first (pad) aspect of the invention. Nevertheless it is preferable to practice this third aspect of the invention in conjunction with certain other features or characteristics, to optimize enjoyment of the benefits of this third facet of the invention.

Accordingly the selectively sealing means and its extension are preferably formed to permit venting of gas from a second end of each chamber, when that chamber is in neither a receiving position nor a delivering position. This second end is opposite to the aforementioned "one end". Preferably the selectively-sealing means comprise a notch at the extension; and this notch enables the venting of gas from the second end of each chamber, through the notch.

Also preferably the apparatus further includes a gas-exhaust plenum positioned to receive the gas vented through the notch from the second end of each chamber. It is preferable that this plenum, in turn, include a plenum body, and positioning means as described earlier for the second aspect of the invention.

It is also desirable that the apparatus include a tube formed within the plenum body, also as described earlier for the second aspect of the invention—and that the interior of the tube be smoothly contoured for prevention of dust buildup inside the tube. It is also preferable that the interior of the tube have cross-sectional area small enough for maintaining adequate velocity to keep dust in suspension while the dust remains within the plenum.

In addition it is preferable the sealing means include a rigid member for reinforcing the sealing-means extension. In this case it is further preferred that the sealing means include a mainly elastomeric body; and that the rigid member be a metal plate. Preferably the metal plate is embedded in the mainly elastomeric body—i. e., preferably the rigid member is embedded in the sealing means. It is further preferable, as mentioned earlier in regard to preferences for the first main aspect of the invention, that the extension be shallower than other portions of the sealing means; and also that an upper surface of the sealing means be stepped downward at the plenum and be complementary to a shape of the plenum. This downward-stepped configuration, when the apparatus has a radial external wall between the expulsion station and the plenum, provides a sliding seal against that outer radial wall of the machine—also as mentioned above relative to the first aspect of the invention.

The advantage of this arrangement is that as the pad wears, i. e. as it is ground off at its bottom surface, and as it therefore descends in the machine, the pad can continue to maintain a seal between the inside and outside of the machine. (Thus the downward-stepped configuration of the extension is advantageous in that it enables maintenance of a beneficial feature of the prior-art pad described earlier.)

Preferably the sealing-means extension covers the gas outlet of the pocket of each chamber in succession.

The apparatus also preferably includes some means for applying force to press the selectively sealing means against the feed-structure body, or against a wear plate fixed to the feed-structure body. These force-applying means preferably include, for regulating the pressure with which the selectively sealing means are applied to the feed-structure body, a control system that is exclusively pneumatic—and so departs from the teachings of the above-mentioned U.S. Pat. No. 5,150,991.

The exclusively pneumatic control system preferably provides sensitive and smooth pressure control for the extension as well as other portions of the sealing means. It is preferable that the exclusively pneumatic control system include a source of compressed gas, a gas-pressure regulator, a pressure control valve between the source and the regulator, and at least one pneumatically operated cylinder with a piston for applying the pressing force to the selectively sealing means.

It is preferable that the exclusively pneumatic control system comprise no check valve between the control valve and any of the cylinder or cylinders. Preferably the exclusively pneumatic control system, by virtue of having no check valve, economically provides smooth control of pressure for the extension as well as other parts of the sealing means.

As taught in the parent patent document, it now continues to appear desirable or at least helpful for air-quality purposes to include a substantially unperforated cone disposed about the rotation axis to block the gas inlets against receiving of material from the hopper.

(The reason for mentioning here that the cone is unperforated is to distinguish the slotted cone, mentioned previously, long used to prevent jamming of relatively larger pieces of particulate material in the gas inlets—particularly in a Reed system. The slot-perforated cone has not been associated with efforts to control dust emissions.)

The disposition of the cone about the axis, however, leaves the gas outlets substantially open for receiving of material from the hopper. In other words, with respect to the direction of gas flow through the feed-structure chambers, the restricting means operate in a way that is directionally selective.

Specifically, the restricting means not only (1) restrict the material in overall quantity, so that each chamber is only partially filled, but also (2) load the material into each chamber at the same end from which it will be expelled. Both these provisions minimize undesired generation of dust, by promoting complete exhaustion of each load of particulate material that is placed in a chamber.

As a result, less material is left over for release, as airborne dust, with the residual pressurization. This closed-cone feature, although considered helpful, is not a part of the present invention—which in principle may be employed either with or without the closed cone.

The several major aspects of the invention, although capable of practice independently of one another, are particularly effective when practiced together, in conjunction with each other. In other words, in addition to the preferences specifically recited above, each of the major facets or aspects of the invention is preferably used in conjunction with the others.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

A general orientation to the elements and operation of a gunite dispensing apparatus appears in the previously mentioned patents, which are wholly incorporated by reference. In the presentation of this document it is assumed that the reader is familiar with those earlier materials.

Figure 1:
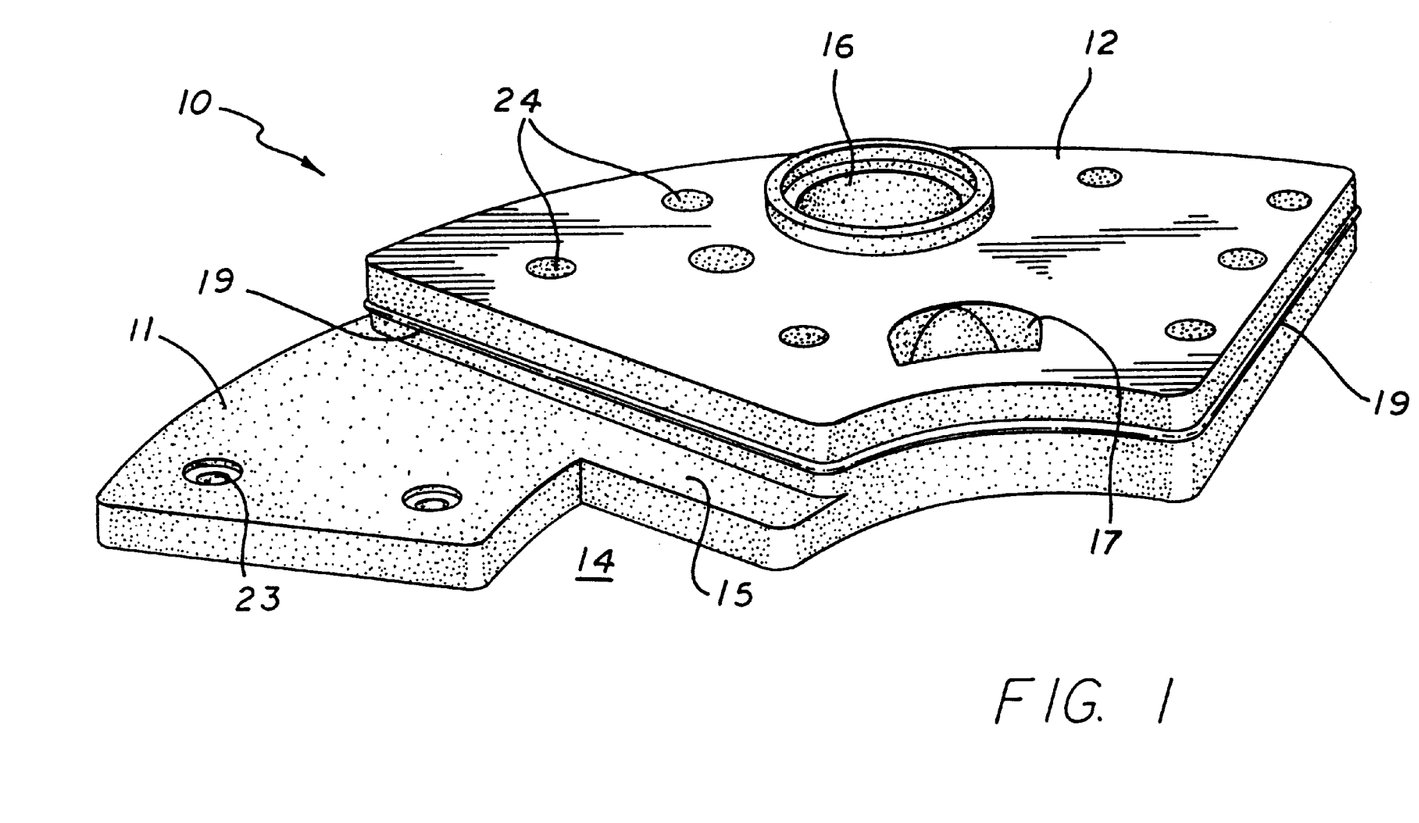
FIG. 1 is an isometric or perspective view of the novel pad of preferred embodiments of the present invention.
Figure 2:
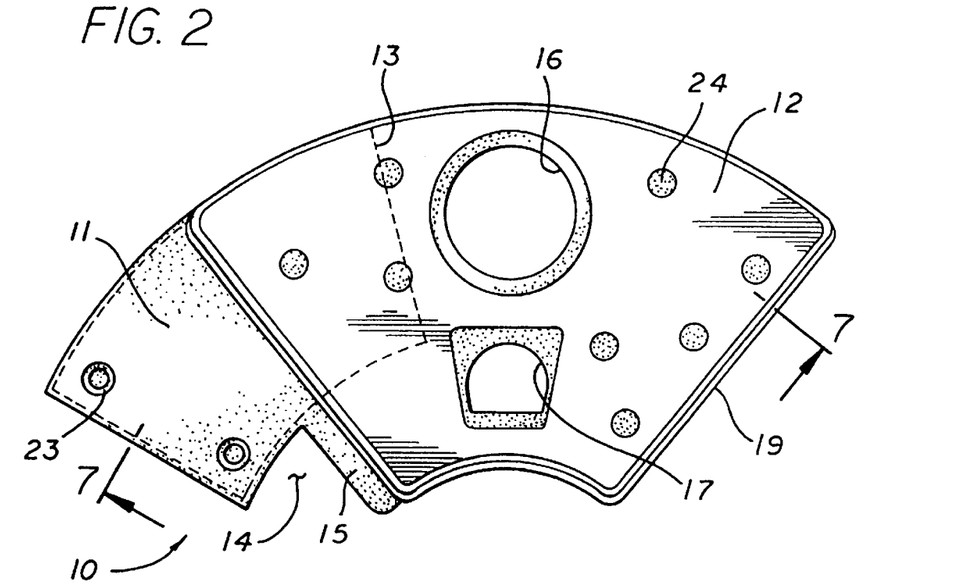
FIG. 2 is a top plan view of the FIG. 1 pad.
Figure 3:
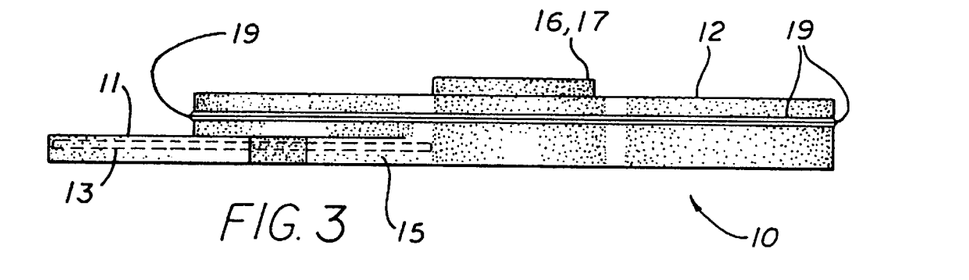
FIG. 3 is an edge-on elevation of the FIG. 1 pad, taken from inside the particulate-material dispensing system, and particularly from the position of a diameter through the system axis.
Figure 4:
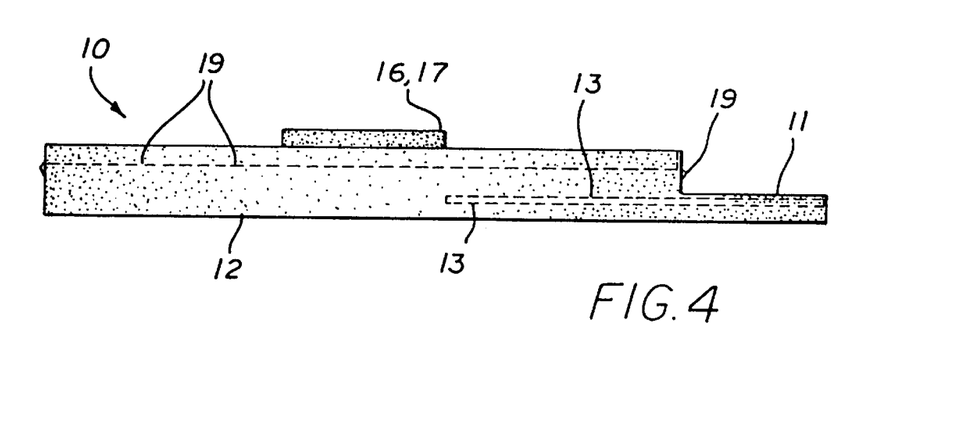
FIG. 4 is also an edge-on elevation of the FIG. 1 pad but taken from the opposite vantage—namely from outside the system, looking toward the interior.
Figure 5:
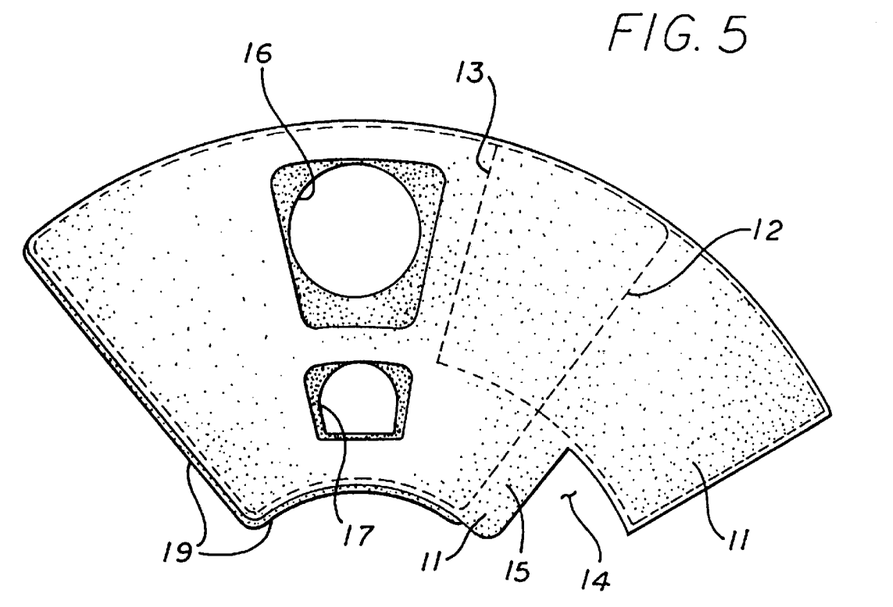
FIG. 5 is a bottom plan of the same pad.
Figure 6:
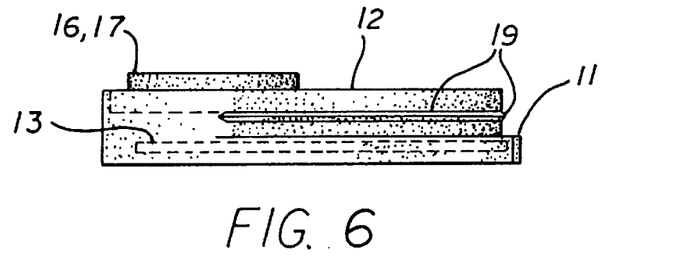
FIG. 6 too is an edge-on elevation of the same pad, taken from the left side as seen in FIG. 2.
Figure 7:
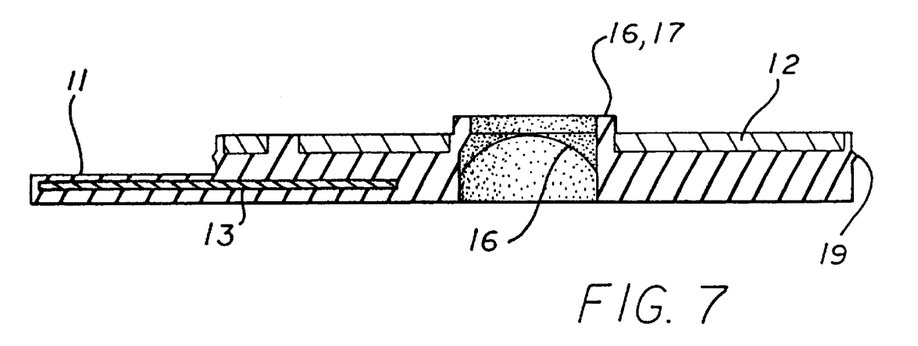
FIG. 7 is an elevation in longitudinal section, taken along the arc 7—7 in FIG. 2—looking outward from inside the system.
Figures 8, 9, 10, 11:
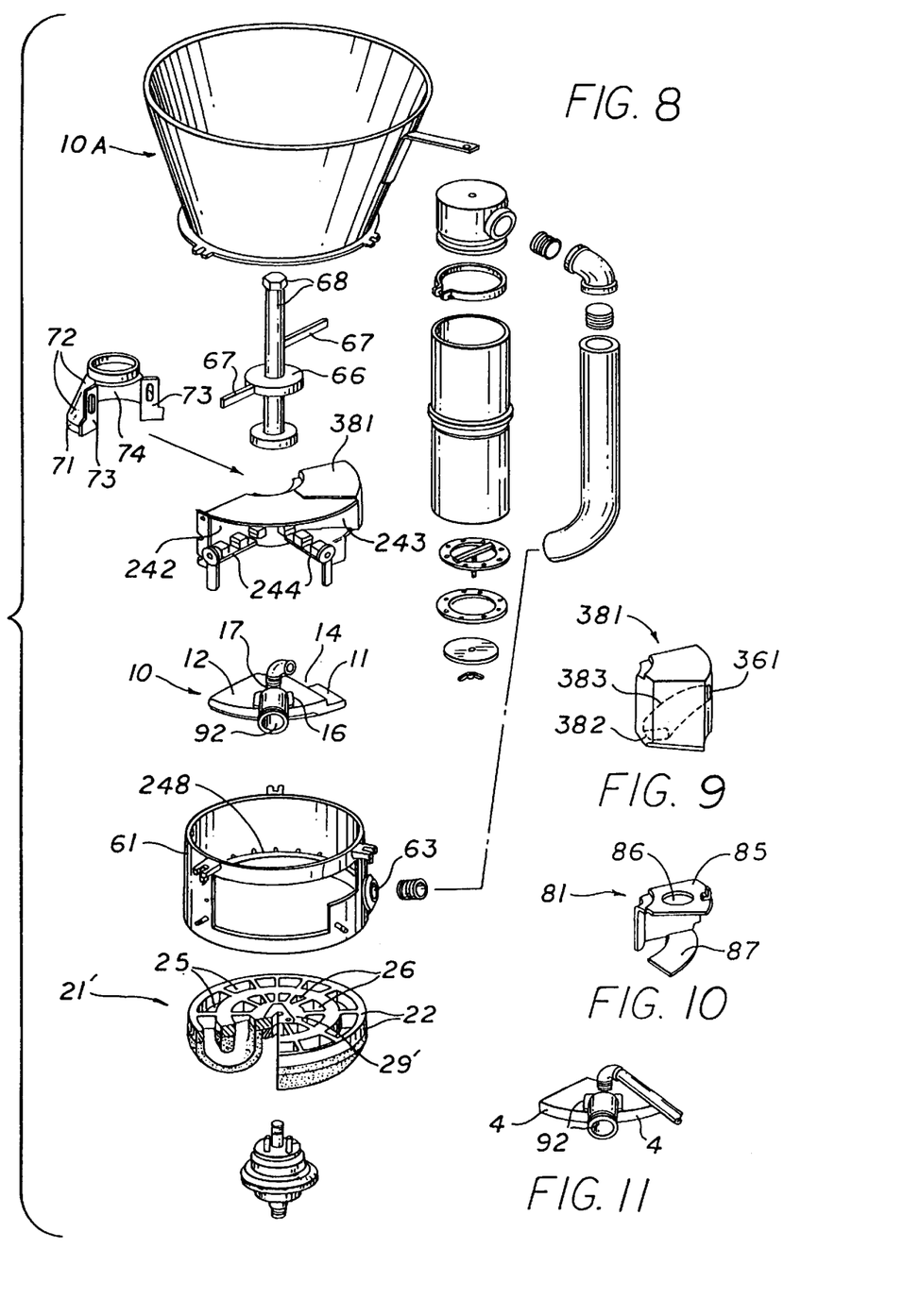
FIG. 8 is an isometric or perspective assembly view, showing major elements of the apparatus or system of the invention, with the pad and dust-control plenum shown incorporated—and using generally the same reference numerals as employed in the parent patent document, for those features which are the same as taught in that document.
FIG. 9 is a like view showing separately the dust-control plenum, and particularly in the phantom line and schematically a contoured tube or lumen which constitutes its interior.
FIG. 10 is a like view, for reference, of the box-style plenum with baffle as taught in the parent patent document.
FIG. 11 is a like view, similarly for reference, of the pad (with attached tubulations) as taught in the parent patent document and very generally in the prior art.
Figure 12:
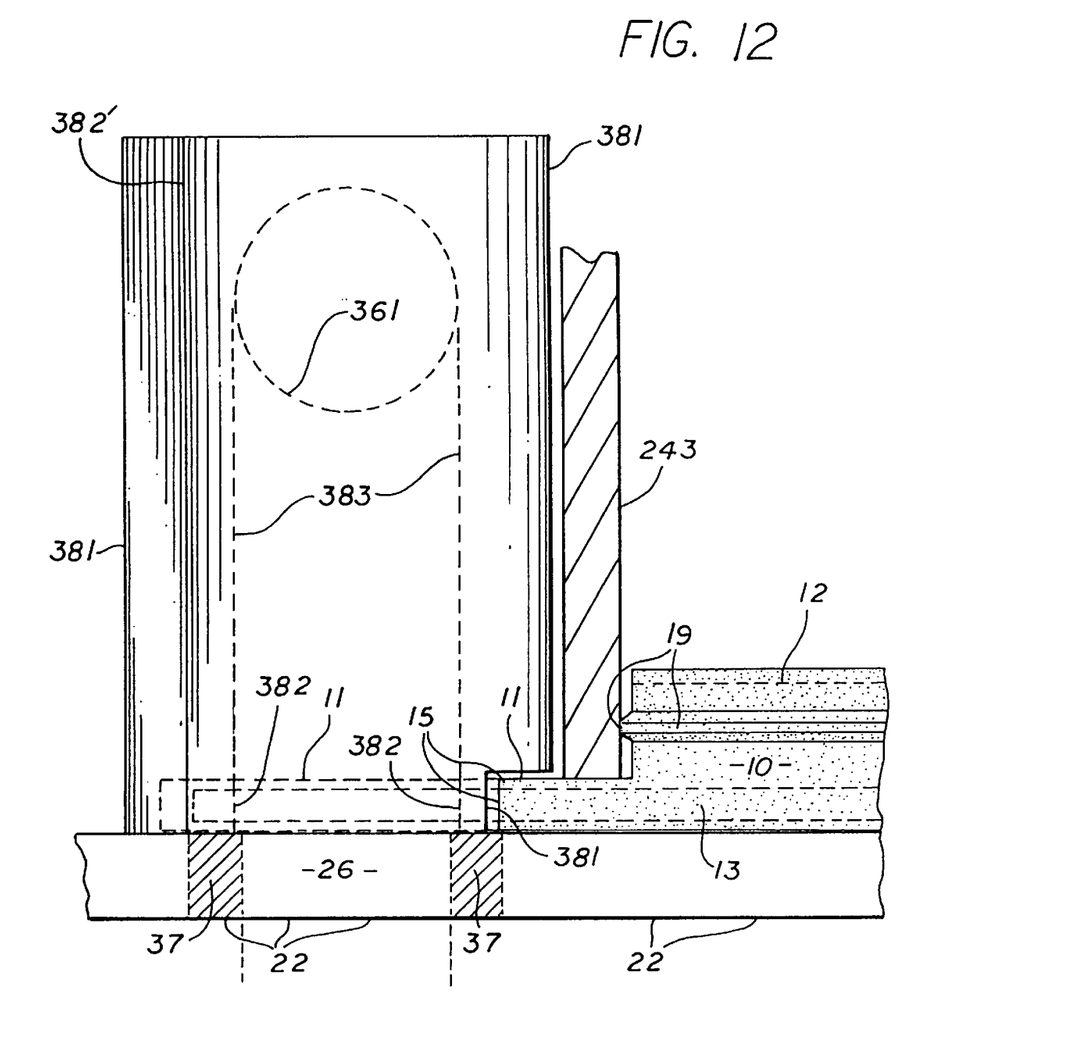
FIG. 12 is a somewhat schematic elevation, partly in section and taken sighting outward along one of the system bulkheads at the pad, showing relationships between the pad, the plenum, the rotary feed structure with its wear plate, and the bulkhead.
Figure 13:
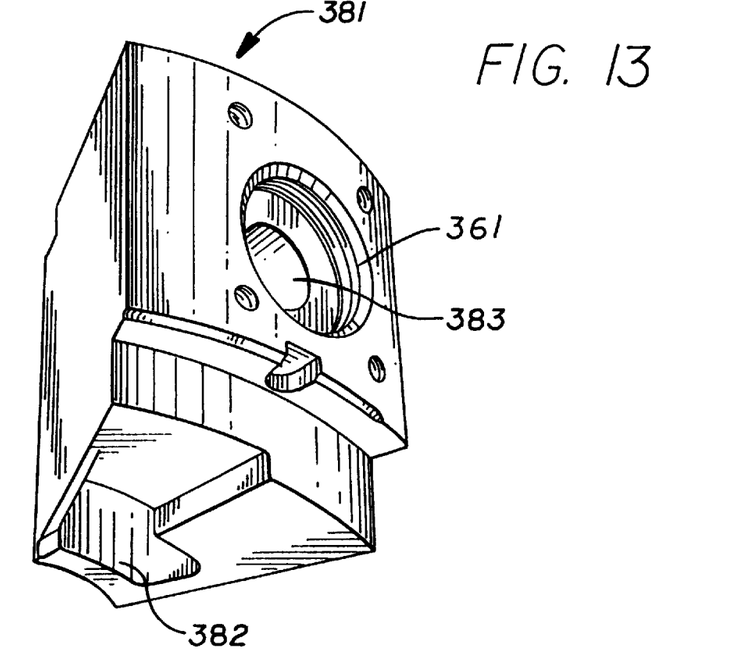
FIG. 13 is an isometric or perspective view of the plenum, taken from below and radially outward (relative to the system axis)
Figure 14:
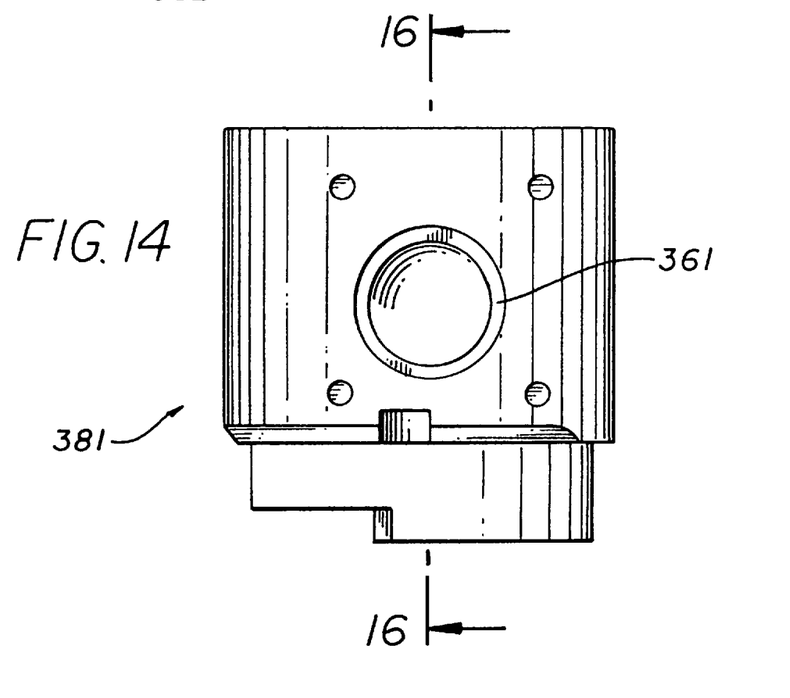
FIG. 14 is an outer-face elevation of the plenum.
Figure 15:
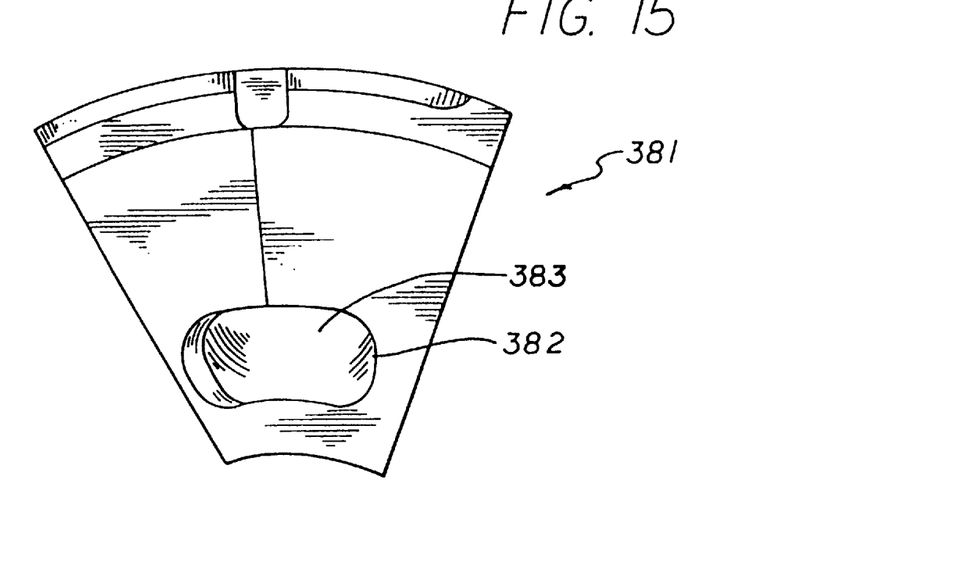
FIG. 15 is a bottom plan of the plenum.
Figure 16:
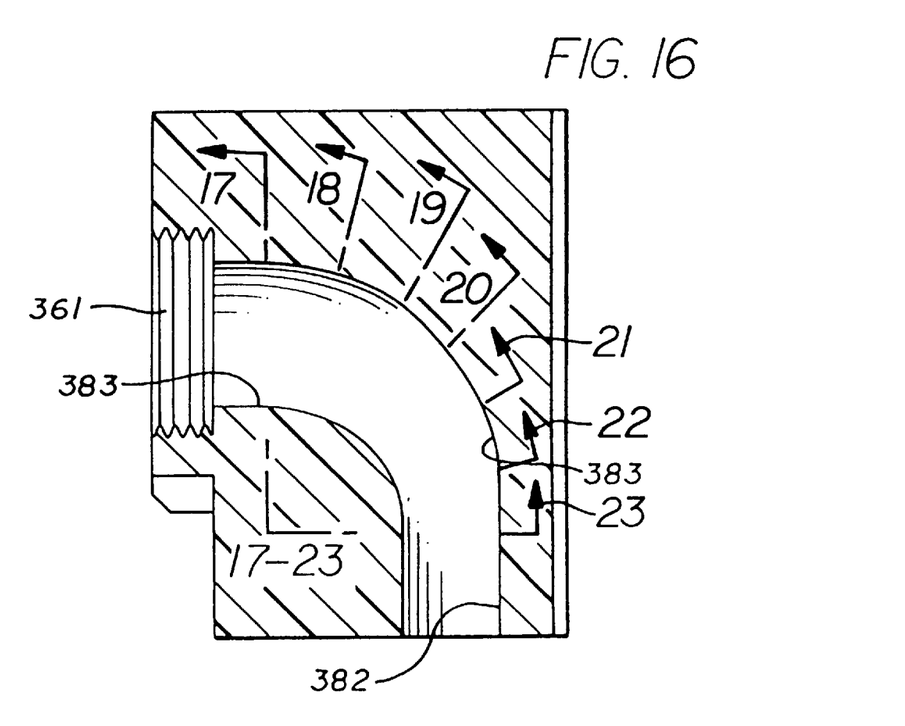
FIG. 16 is a longitudinal section taken along the line 16—16 in FIG. 14.
Figures 17, 18, 19, 20, 21, 22, 23:
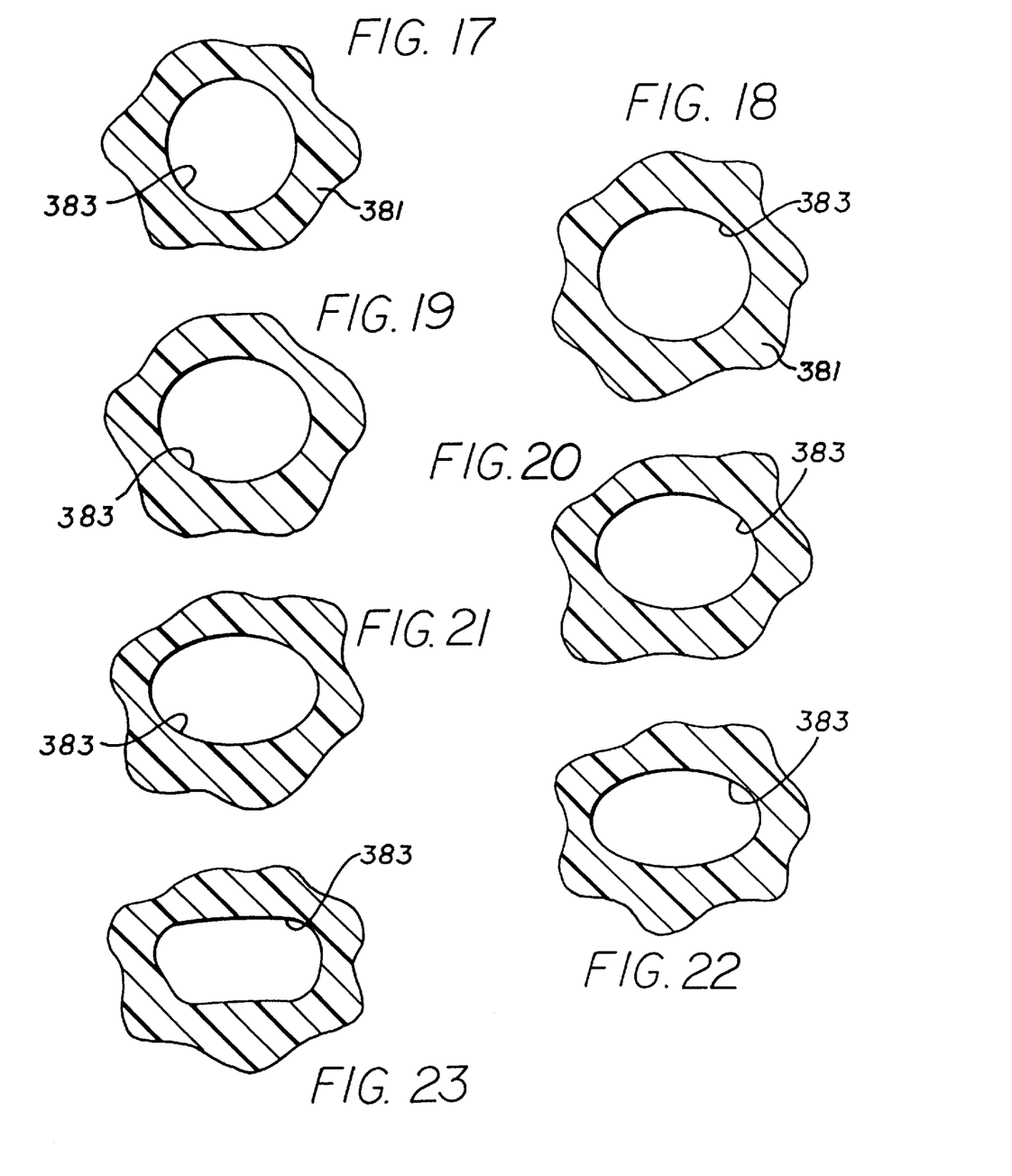
FIGS. 17 through 23 are a series of partial cross-sections, taken at respective angles along the lines 17—17, . . . , 23—23 in FIG. 16.

FIGS. 1 through 7 focus on the novel seal or "pad" of the present invention, and FIG. 8 shows that element in context with all of the other main components of the particulatematerial dispensing machine of the present invention. FIGS. 9 and 12 focus on the plenum, its interfitting with the pad, and its relation to the air-inlet apertures of the feed-structure wear plate. FIG. 13 shows the simplified pad-clamping system.

(a) The selective-venting portion of the dust-control subsystem—To the right of the right-hand radial wall 243 in FIG. 8 is one form of selective-venting means as described in an earlier section of this document. As shown, a separate segmentally shaped plenum 381 is disposed in that region, within the casing 61 and above the counterclockwise-rotating (as viewed from above) feed bowl 21'.

This dust-collection plenum 381 receives residual pressurized air from each pocket, as the pocket emerges from beneath the sealing pad 4. The plenum 381 is cast with a smoothly contoured inner passageway or lumen 383 (FIGS. 8 and 12), whose lower footprint 382 is aligned with the inner ring of passageways 26 in the bowl 21'—and whose upper, outer orifice 361 is aligned with the external port 63 of the system casing 61.

The lower footprint 382 of the lumen 383 communicates only with the inner ring of passageways 26, not the outer ring of passageways 25. Moreover, the outer ring of passageways is tightly blocked by the extension 11 (FIGS. 1 through 8) of the novel pad 10.

Therefore essentially none of the residual pressurization can be relieved through the radially outward end 25 of each pocket. Pressure release is essentially entirely through the radially inward passages 26.

Thus pressure escape is in a direction opposite to the direction of air flow during the particulate-dispensing mode of operation. After leaving each pocket through its inward passage 26, the pressurized air makes its way from the plenum 381 and casing 61—through the exit hole 361 in the plenum 381 and the port 63 in the casing 61—for collection outside the housing if desired, as for instance in a bag 118 or in a misting system (not shown here), each being described extensively in the parent patent document.

As pointed out in the parent patent document, in regard to the relationship between the box-style dust plenum 81 (FIG. 10A) and the adjacent oiled felt sealing ring 248 (FIG. 8), an auxiliary port 86 is preferably formed in that type of plenum to facilitate tamping down the felt seal 248 from time to time. In the present system at least so far no such provision has been found necessary.

There may be two reasons for this difference. First, the continuously contoured plenum 381 of the present invention can be effectively sealed against the inside of the casing 61, so that there is little or no particulate material loaded above the seal 248 in the region subtended by the plenum 381. Second, the extension 11 is far more effective than the baffle 87 (FIG. 10A) in deterring pressurized application of particulate material to the seal, upon relief of the residual pressurization from each pocket.

In any event, should it become desirable, an auxiliary port analogous to the port 86 can be readily provided in the present invention. Such a port, however, to avoid dust buildup in the plenum, would be preferably in the form of a plug with a fitted bottom panel—carefully matched to the contour of the upper central segment of the lumen 383, to maintain the smooth shape described earlier.

Figures 25, 26:
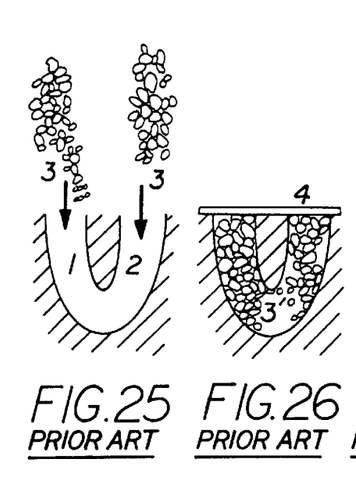
FIGS. 25 through 30 are a highly schematic or conceptual series of radial sections through one pocket of the FIG. 8 feed structure as that pocket rotates through several successive positions and functions within the apparatus, showing the movement of particulate material and propulsive air according to the prior art.
Figure 27:
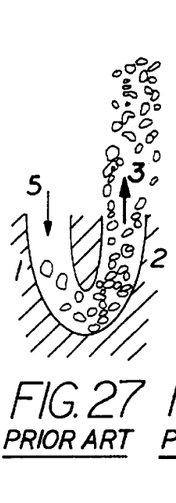

(b) Operation of the prior art with regard to dust generation—The foregoing dust-control provisions proceed from a recognition of the undesirable operation of the priorart conveying system as diagramed in FIGS. 25 through 30. In FIG. 25 particulate material 3 falls into a representative pocket through both its air-inlet 1 and air-outlet 2 passageways.

In consequence, as shown in FIG. 26, material 3 completely fills the pocket. FIG. 26 shows the full pocket after it has moved from the hopper-inlet region under the sealing pad 4, before the pocket reaches the leading edge of the expulsion station.

Next the full pocket emerges (FIG. 27) from under the pad into the expulsion station, where it passes under the compressed-air or pressurized air 5 source. Pressurized air 5 entering the air inlet 1 blows the particulate material 3 out through the air outlet 2 as a stream into the delivery tube (92, FIG. 8).

Figure 28:
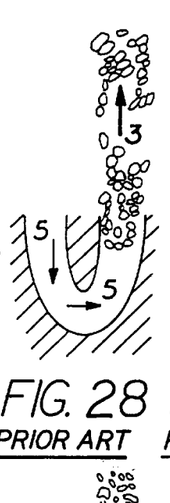
Figure 29:
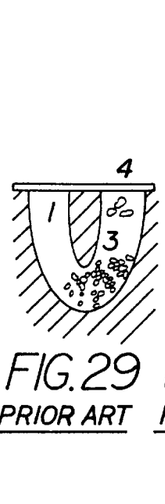

FIGS. 28 and 29 suggest that as the pocket approaches the end of its pressurized region—in other words, as the pocket is closed off by returning under the pad 4 at the trailing edge of the expulsion station—not all of the material 3 which is in flight manages to actually leave the pocket. A significant amount of material 3 still remains within the pocket and is trapped just inside the air-outlet end of the pocket by the resealing process.

As FIG. 29 suggests, however, that residual material 3, having been trapped at the air-outlet end, is localized primarily at that end. Relatively very little of this material is in the air-inlet end of the pocket. It may be realized that these processes actually occur very rapidly, and much of the material may be pressed upward by its own momentum against the underside of the pad 4.

As the pocket emerges from under the trailing edge of the entire pad (FIG. 30), the particles that were previously moving toward the pad at the air-outlet end of the passage may not have had time to fall back into the pocket, and to a large extent may still be clustered at the outlet end.

Figure 30:
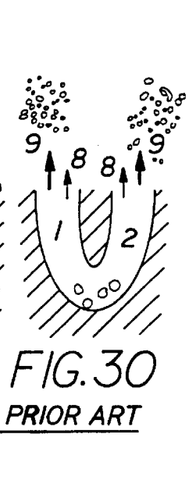

When the pocket passes the pad 4, pressure 8 is relieved at both ends of the tube—correspondingly carrying particles 9 of dust, and some very small gravel, out of the passageway in both directions. Since the material was trapped nearer the outlet end, however, the greater bulk of the material tends to be discharged from the outlet end 2 of the passage.

(c) Operation of the dust-control subsystem of the present invention—As shown in FIGS. 31 through 36, the dust cone 10A restricts filling of each pocket to movement of particulate material 13' through the outer passageway only. Although somewhat greater pressure may be generated, the net result is a partial fill by material 13', as shown with the pocket under the leading edge of the pool 10 in FIG. 32.

Figure 33:
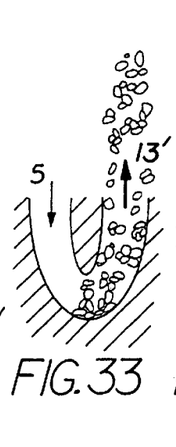
Figure 34:
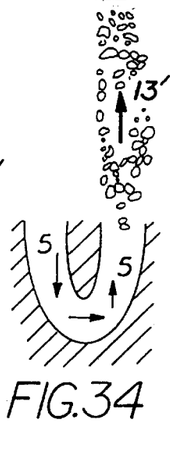

FIGS. 33 and 34 indicate that, for two reasons, exhaustion of the particulate material 13', upon injection of pressurized air 5, may be correspondingly more complete: for the same air pressure, there is (1) less material inertia to be overcome, and (2) a shorter train of material to pass through the outer-passageway orifice. These observations may become more clear through detailed comparison of the drawings showing the corresponding operational phases in FIGS. 25 through 30 and FIGS. 31 through 36.

Figure 35:
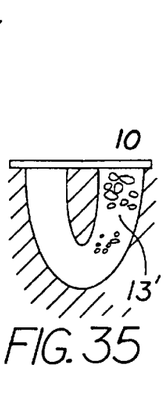

Thus at FIG. 35, relative to FIG. 29, a much smaller residual of material 13' is trapped under the pad 10 at the trailing edge of the expulsion system. Furthermore this smaller residual may be even more strongly concentrated just immediately under the pad at the outlet end of the chamber.

Figure 36:
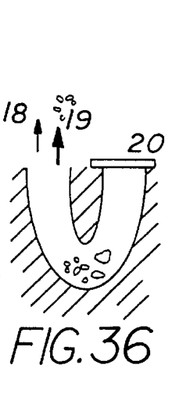

Accordingly in FIG. 36 when pressure is relieved, there is much less material to fly out with the pressurized air. Of at least equal importance, because the outward end of the passageway is blocked 20, almost all of that compressed air is already on the escape side of the trapped particles.

Figure 31:
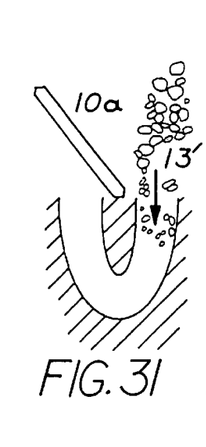
FIGS. 31 through 36 are a corresponding series of sections, but for the present invention, demonstrating the refinements and improved performance introduced by the dust-control aspects of the invention.
Figure 32:
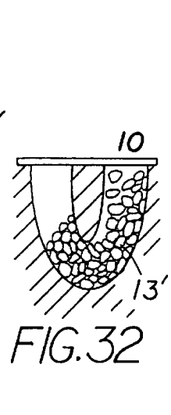

As the air 18 expands out of the chamber it can therefore carry with it very little particulate material 19: a large fraction of that little material which is still present simply falls to the bottom, where it remains until the pocket rotates back under the hopper for refilling (partial refilling) as in FIG. 31.

In summary three effects are utilized in combination to hedge dust emissions toward the smallest possible amount:

(1) a short fill, plus (2) concentration of the short fill at the outlet —to promote near-total emptying of the chamber in each cycle, with as much of the residual as possible concentrated at one end (the outlet end)—plus (3) obstruction of the end of the chamber at the end where most of the material is concentrated—to minimize the amount of material that can be downwind of the expanding, escaping air.

The system illustrated and discussed above is advantageous in that it very significantly reduces the amount of dust emitted, and particularly in that it is relatively easy to implement. The latter is true because it requires no major reconfiguration of the most touchy and massive subsystems.

This system has proven itself far superior to that described in the parent patent document using a stood-off baffle 87 (FIG. 10)—which inherently does not make a good seal such as symbolized at 20 in the conceptual presentation of FIG. 36. Rather, the baffle 87 was outside the reach of the prior art pad 4 and simply rested loosely against the spinning wear plate.

Thus inherently a certain amount of fine material could readily escape around the edge of the baffle. This effect could be aggravated if after considerable usage a certain amount of intermediate-fine material began to collect in the region of the baffle. Such an accumulation tended to stand the baffle up very slightly away from the wear plate and so open a wider path for escape of silica-fume silt and the like.

The best that could be managed in the baffle system was to protect the felt seal—while possibly compromising dust control to some extent—by deliberately raising the baffle 87 about 2 to 2½ cm (¾ inch to 1 inch) above the wear plate.

(d) The new pad—The present novel pad of FIGS. 1 through 8, however, achieves instead an excellent performance as the culmination of the "ongoing experimental program" mentioned in the parent patent document. This is accomplished by integrating the selective pressure-venting path into the existing sealing-pad system, but without the very large, apertured pad shown and described in the parent document.

The "major redesign" of which the parent document warned, as a necessary adjunct of an extended pad, has been circumvented. Instead it has been found that the modest extension 11 (FIGS. 1 through 8) provides the same theoretical results as the large pad.

Instead of an aperture in the pad, or in other words an orifice entirely surrounded by sealing material as shown in the parent document, the present pad has merely a notched or cutaway corner 14. The residual pressurization escapes readily through this notch.

As in the prior art, the pad is primarily elastomeric. The main section of the pad 10—that is, the portion other than the extension 11—as in conventional pads is nearly all covered by a metal plate 12 that receives and distributes the clamping force provided by the clamping cams 244, 444 (FIGS. 7 and 24).

That plate has several orifices 24, most of which in the course of casting the assembly are filled by elastomer—thus stabilizing the plate. Moreover, in preparation for casting, at certain of the orifices 24 the plate is supported relative to the mold, providing initial locating of the plate.

The extension 11 has a simple internal reinforcement 13, which is preferably in the nature of an embedded metal plate as mentioned earlier. The reinforcement 13 is preferably mild steel, and distinct from the metal (preferably cast iron) plate 12 that engages the clamping cams.

The reinforcement 13 extends through almost the entire extension 11, and into about thirty percent of the angular extent of the rest of the pad (as seen in FIGS. 2 and 5). In preparation for casting of the assembly, the reinforcement 13 is positioned relative to the mold by two locators 23.

The reinforcement 13 thereby suffices to hold the extension 11 solidly against the wear plate 22, 37, in the vicinity of the outer, material-exhaust end 26 of each pocket. The result is a very effective seal of the exhaust end of the pocket, just as shown at 20 in FIG. 36.

This configuration requires no elaborate or expensive modification of the pad clamping system. In fact, as will be shown shortly the clamping system has been significantly simplified, with major economies and operating improvements in the bargain.

As FIGS. 1, 5 and 12 show, the pad has a narrow ledge 15 adjacent to the notch 14. This ledge 15 acts as a spacer, setting the operative opening—provided by the notch—beyond the bulkhead 243.

The ledge spaces the notch at just an ideal distance past the material expulsion station to isolate the dust-control operation from the material-delivery operation, but without needlessly elongating the pad. The distance is preferably two full pocket widths, so that the high-pressure activity at the expulsion station is separated by two pressurized but otherwise passive pockets from the residual-pressure-relief activity in the plenum.

The pad also has a vertical step between the main section, at the expulsion station, and the extension 11. In other words, the extension 11 is shallower than the pad proper 10. As FIG. 12 suggests, the vertical step accommodates the vertical movement of the bulk of the pad that results from wear of the bottom of the pad against the wear plate 22, 37.

To help maintain a clean seal between the inside and outside of the machine, a sealing lip or ridge 19—functioning in effect as an integrated O-ring—encircles all those vertical surfaces (See FIGS. 1 and 12) of the pad that engage vertical metallic surfaces of the machine.

In purest principle the pad can be notched rather than stepped—that is to say, the extension need not be shallower than the rest of the pad—and the bottom edge of the bulkhead 243 can fit into that notch in the top of the pad, rather than simply against the vertical step and its circumferential seal 19. In the present configuration of the dispensing machine, however, this requires disassembly of the machine to remove or replace the pad.

It will be understood that the machine could be modified to enable a notched pad to be withdrawn from the machine by sliding it out along the bulkhead 243 (FIG. 8) that is at the extension side of the pad. Analogously, the machine could be modified to encompass the entire pad (including the portion which in this document has been denominated the "extension") between the two bulkheads 242, 243—with the plenum and its lumen perhaps approaching the form of a tubulation, at a port through the pad—as in the parent patent document. In this latter case the lip or ridge 19 would also go around the sealing vertical surfaces of the extension 11, whereas in the currently preferred embodiment of FIG. 1 the extension 11 has no vertical surfaces that seal against other parts of the machine.

Although well within the scope of certain of the appended claims, such solutions would be undesirable. In order to maintain as much standardization as possible, particularly relative to existing machines distributed over several decades and still in the field, it is strongly preferable to step the pad.

Preferable dimensions of the novel pad are as follows.

| cm | inch | item |
| --- | --- | --- |
| 2.54 | 1.000 | overall thickness of the main section of the pad, excluding the upstanding port 16 |
| 0.635 | 0.250 | height (length) of the upstanding port 16 |
| 19.53 | 7.688 | radius of curvature of the outer vertical surface of the main section of the pad |
| 6.35 | 2.500 | radius of curvature of the inner vertical surface of same |
| | 80.0° | overall angular extent of the pad proper (excluding both the ledge 15 and the main part 11 of the extension) |
| 0.95 | 0.375 | overall thickness of the extension 11 |
| 8.49 | 3.344 | radial extent ("width") of the extension |
| 11.75 | 4.625 | inside radius of curvature of the extension 11 |
| | 21.5° | angular extent of the main part of the extension 11 beyond the adjacent edge of the pad proper |
| 1.27 | 0.500 | width of the ledge 15 |
| 0.318 | 0.125 | thickness of the mild-steel insert 13 |
| 0.160 | 0.063 | typical inset of the insert from the exterior edges (three) of the elastomer |
| 0.478 | 0.188 | height of the bottom of the insert above the bottom of the pad and extension (before wear) |
| 0.160 | 0.063 | depth of the top of the insert below the top of the extension |
| | 46.5° | approximate angular extent of the insert |
| 0.229 | 0.090 | overall height (vertically) of the ridge/lip 19 |
| 0.102 | 0.040 | extension of the ridge/lip 19 outward (horizontally) from the vertically stepped surface of the pad proper |
| 1.59 | 0.625 | elevation of the ridge/lip centerline above the bottom of the pad |
| 0.80 | 0.313 | thickness of upper, cast-iron plate 12 |
| 19.23 | 7.594 | outside radius of curvature of the plate 12 |
| 6.51 | 2.562 | inside radius of curvature of the plate 12 |

As will be understood, the remaining detailed dimensions of the ports, locating anchors and other features are generally conventional and so may be found from inspection of prior pads. Some limited amount of trial and error may be found helpful as to the interior contouring of the ports 16, 17—but this is related primarily to optimizing of material flow, as distinguished from the particular dust-control objectives of the invention.

(e) The new plenum—FIGS. 12 through 16 also show that the plenum 381 has a complementary cutaway (at its lower right-hand corner as drawn in FIG. 12), accommodating and sealing against the top of the ledge 15. The plenum is shaped segmentally, as suggested by the showing of the near left-hand vertical corner 382' in FIG. 12 and as seen plainly in FIGS. 13 and 15.

A lumen 383 interconnects the lower open footprint or dust-intake port 382 of the plenum with its dust-exhaust port 361. This passageway 383 is smoothly contoured, in contrast with the box shape of the earlier plenum (FIG. 10).

The cross-sections of FIGS. 17 through 23 are accurately drawn. Considered in conjunction with their defining planes shown in FIG. 16, these seven sections make clear how the interior contour of the cavity in the plenum progresses from a horizontal oblong shape (FIG. 23) at the bottom to a vertical circle (FIG. 17) at the outer surface of the casing 61.

The bottom section very generally matches the radial extent of the inner pocket openings 26 in the bowl, and generally spans the circumferential range of those openings while the opening rotates under the plenum. The cavity or lumen 383 thus curves smoothly to meet the outer fitting 63 (FIG. 8). This smooth contouring is considered very desirable to avoid buildup of dust inside the structure.

The smooth contouring of the lumen 383 also helps to maintain adequate airflow velocity to keep the fine dust suspended in the flow, as the dust travels through the plenum—once again contributing to continuous removal of the material, i. e., with minimal chance for buildup in the plenum. As will be understood the operating speed of the overall machine, the residual pressurization, and the amount of dust exhausted from each pocket in each cycle are all variable with several different conditions, and it is desirable that the airflow be adequate to keep the dust in suspension under all of these conditions.

Within the general requirements just described, it is not believed that specific shaping or dimensioning of the lumen 383 or its end orifices 361, 382 is critical.

Figure 24:
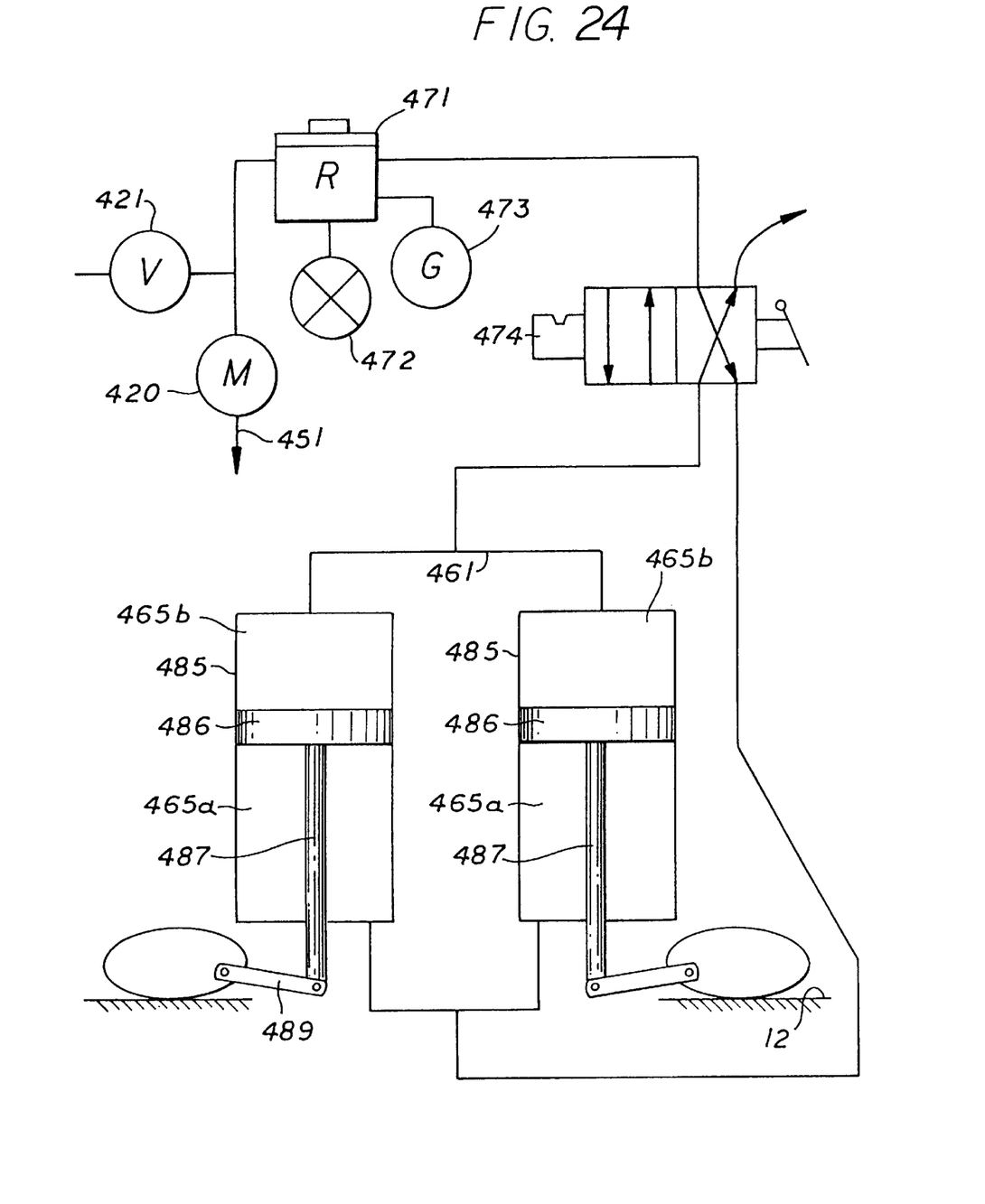
FIG. 24 is a schematic diagram of the pneumatic system that controls the clamping pressure applied to the pad.

(f) All-pneumatic system for control of pad-clamping force—FIG. 24 requires little discussion as it follows closely the corresponding control diagram of the above-mentioned U.S. Pat. No. 5,150,991. The present FIG. 24 shows a system which comports with the basic teachings of that patent, but is greatly simplified.

In accordance with the present invention it has been established that the hydraulic portions of the control system in the '991 patent—including the check valve—can all be removed without deleterious effect on system operation. The resulting all-pneumatic control system has no hydraulic fluid to leak, and yet operates the pad-clamping cams smoothly and positively.

FIG. 24 shows a schematic closely similar to FIG. 1 of the '991 patent. Some discussion of components introduced in that patent is summarized briefly here. For example, a motor 420, symbolized as M, and a driveshaft 451 (20 and 51 in the '991 patent) drive the feedbowl (21' in FIG. 8).

Furthermore, a valve 421, symbolized as V, and its ancillary pneumatic lines (21, 52, and 53 in the '991 patent) are used as a source of compressed air to regulate and balance or equalize the clamping force applied to the sealing means. Also installed, with substantially the same function as those stated in the '991 patent, are a lower-pressure regulator 471, symbolized as R, a handle or like manual control 472, symbolized as X, and a gauge 473, symbolized as G (respectively 71, 72, and 73 in the '991 patent). In addition, a four-way selector valve 474 (74 in the '991 patent) and other components of its group (not discussed here, but see the '991 patent) are in place for controlling the operating mode of the rest of the system.

Two parallel cylinders 485 (85 in the '991 patents are pressurized pneumatically in chambers 465*a* and 465*b*. This is different from the cylinders in the '991 patent, which are pressurized hydraulically. Pistons 486, rods 487, pneumatic line 461 (86, 87, and 61 respectively in the '991 patent), and other components are installed to complete the clamping mechanics of the system.

Thus the fundamental fluidic-control implementations of that earlier patent have been validated, with a new economy, reliability, and simplicity.

In the accompanying claims generally the term "such" is used in the body of each claim following the preamble when reciting elements of the claimed invention, for referring back to features which are introduced in preamble as part of the context or environment of the claimed invention. For example, in the body of a claim directed to the pad per se, the rotary feed structure is recited as "such rotary feed structure". In a claim directed to the whole mechanism, by contrast, the same rotary feed structure is recited as "the rotary feed structure." The purpose of this convention is to aid in more distinctly and emphatically pointing out which features are elements of the claimed invention, and which are parts of its context—and thereby to more particularly claim the invention.

It will be understood that the foregoing disclosure is intended to be merely exemplary, and not to limit the scope of the invention—which is to be determined by reference to the appended claims.

What is claimed is:

1. A pad, for use in a particulate-material-conveying machine that has a rotary feed structure with chambers that receive particulate material, through a material-inlet end of each chamber, at an intake sector of the machine, and convey the particulate material for delivery through a material-outlet end of each chamber when that chamber is positioned at an expulsion station of the machine, said machine also having a dust-exhaust plenum following said expulsion station; said pad comprising:

a substantially unitary surface for sealing against such rotary feed structure at such expulsion station, around both such material-inlet end and such material-outlet end of each such chamber;

a material-delivery port formed through said surface; and an extension, substantially integral with the surface, for sealing against such material-outlet end of each such chamber at such dust-exhaust plenum.

2. The pad of claim 1, wherein:

said port is for delivery of such particulate material from each such chamber which is at such expulsion station; and said extension is for sealing against such chamber which has passed away from such expulsion station and reached such dust-exhaust plenum.

3. The pad of claim 1, further comprising:

means for reinforcing the extension to maintain effective sealing pressure of the extension against such material-outlet end of each such chamber, at such dust-exhaust plenum.

4. The pad of claim 1, wherein:

the surface and the integral extension are both defined in a single unitary generally elastomeric body.

5. The pad of claim 4, further comprising:

a reinforcing plate embedded in the generally elastomeric body;

part of said plate being within the extension.

6. The pad of claim 5, further comprising:

means fixed in or to the elastomeric body for receiving clamping pressure.

7. The pad of claim 6, wherein:

the pressure-receiving means comprise a second, discrete plate.

8. The pad of claim 1, for use in a machine that has an external wall between the expulsion station and the plenum; and wherein:

the extension is shallower than other portions of the pad; and an upper surface of such pad is stepped downward at such plenum, for providing a sliding seal against such external wall of such machine.

9. A pad, for use in a particulate-material-conveying machine that has a rotary feed structure with chambers that receive particulate material at an intake sector of the machine and convey the particulate material for delivery through a material-outlet end of each chamber when that chamber is positioned at an expulsion station of the machine, said machine also having a dust-exhaust plenum following said expulsion station; said pad comprising:

a surface for sealing against such rotary feed structure at such expulsion station;

a material-delivery port formed through said surface;

an extension for sealing against such material-outlet end of each such chamber at such dust-exhaust plenum; and a notch for passing pressurized air from an air-entry end of each such chamber.

10. The pad of claim 9, wherein:

the extension is shallower than other portions of the pad; and an upper surface of the pad is stepped downward at such plenum and is complementary to a shape of such plenum.

* * * * *